INVENTOR:
HISAO KOIZUMI

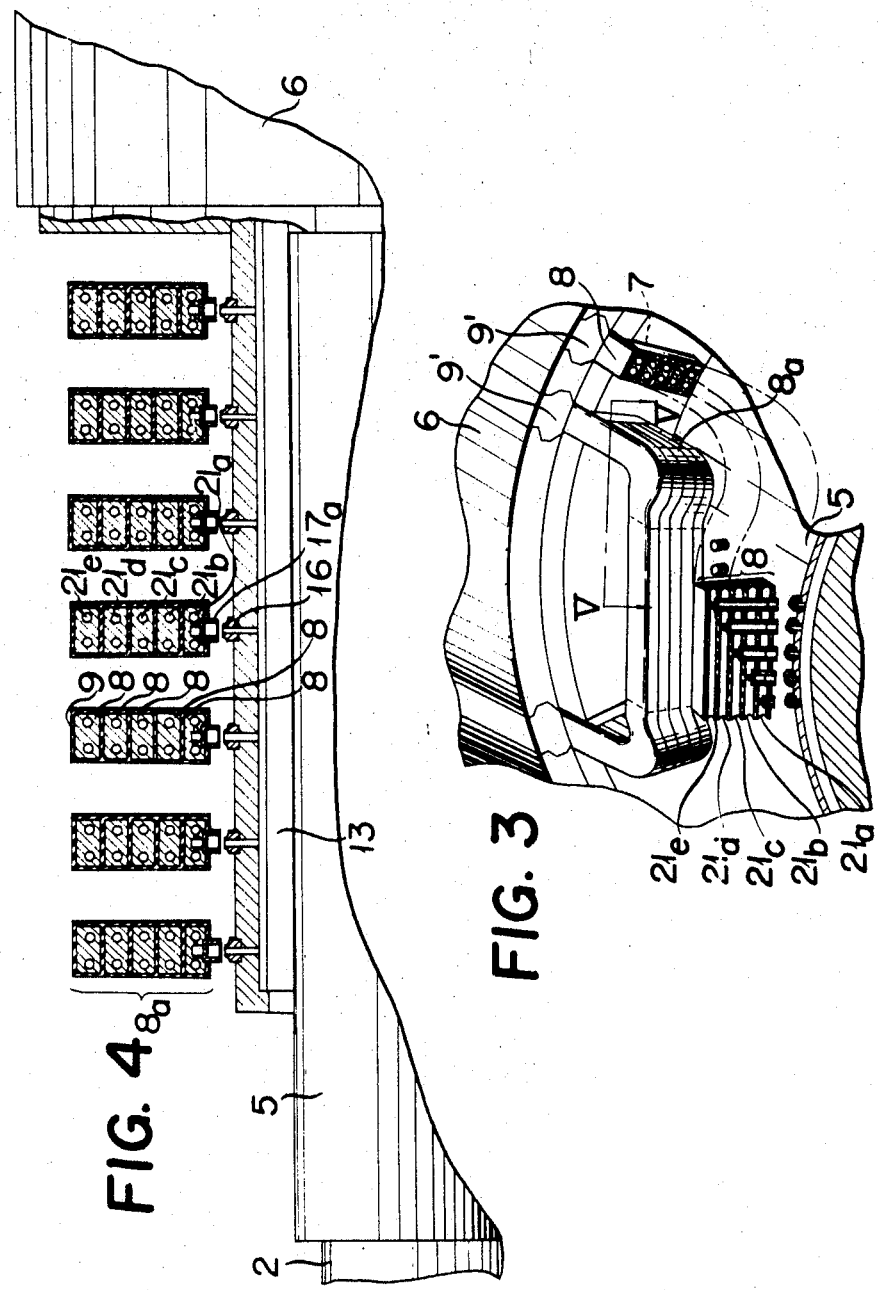

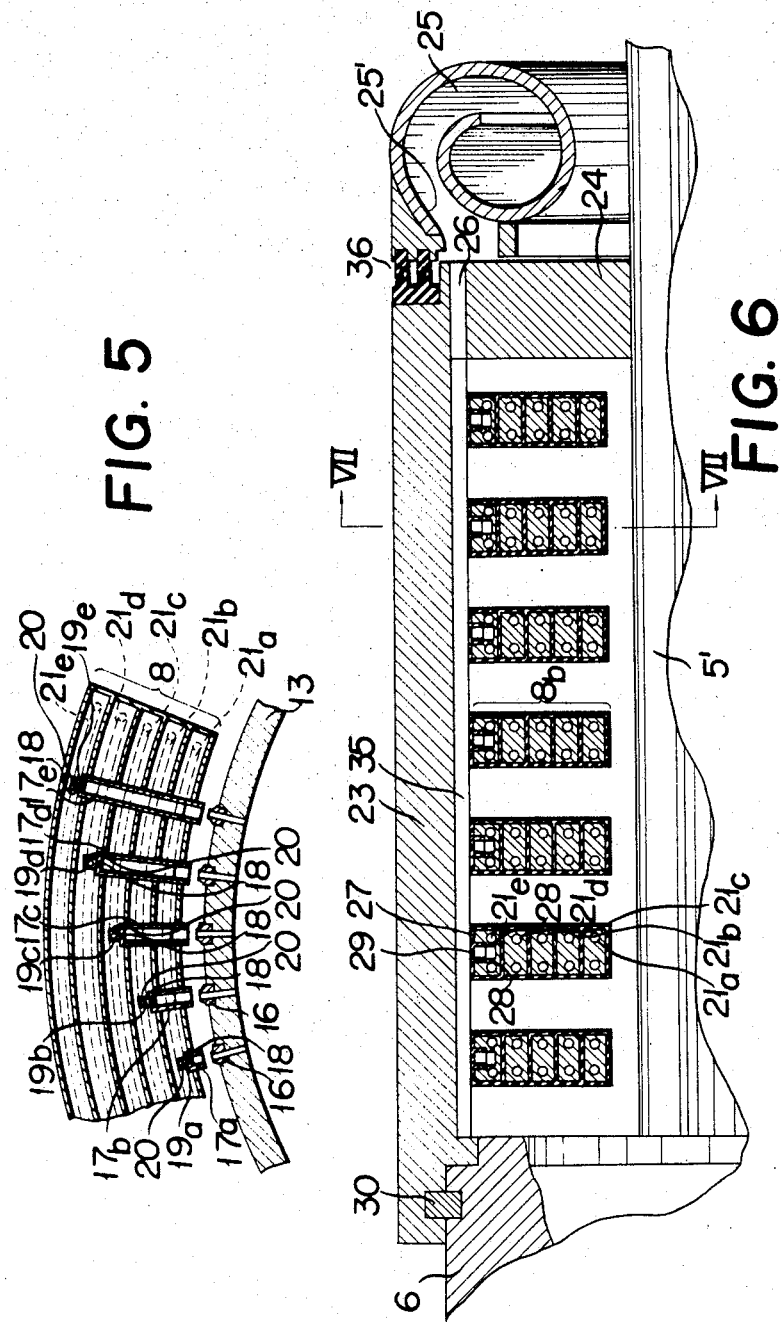

United States Patent Office 3,439,203
Patented Apr. 15, 1969

3,439,203
ROTOR OF AN ELECTRICAL ROTARY MACHINE
Hisao Koizumi, Kawasaki-shi, Japan, assignor to Tokyo Shibaura Electric Co., Ltd., Kawasaki-shi, Japan, a corporation of Japan
Filed Aug. 24, 1966, Ser. No. 574,607
Claims priority, application Japan, Aug. 31, 1965, 40/52,975; Oct. 5, 1965, 40/60,547
Int. Cl. H02k 9/19
U.S. Cl. 310—54                                10 Claims

ABSTRACT OF THE DISCLOSURE

A cooled rotor assembly wherein a free space is formed between the coolant supply nozzles and the rotor windings, thus enabling the hydraulic pressure to be lowered.

---

This invention relates to the cooling of dynamoelectric machine rotors, and more particularly to an improved arrangement for circulating a fluid coolant in direct contact with the rotor windings through passages formed in individual conductors, while providing for thermal movement of the windings.

One of the chief limitations to increasing the capacities of large turbine-driven generators without substantially increasing the weight is the temperature of the rotor windings. Increasing the current supplied to the field winding on a generator rotor in order to raise the capacity by increasing effective ampere-turns also increases the amount of heat generated due to losses in the windings. Cooling of the rotor, in order to hold the winding temperatures to reasonable levels, has heretofore been accomplished by circulating air or hydrogen gas through suitable passages in the rotor.

It has been known that "Direct-cooling" or circulating the coolant in close contact with the conductors has resulted in improved cooling, and more particularly that liquid coolants are more efficient heat transfer media than gases and are used to cool by the evaporative cooling. However, the application of liquid cooling to the rotor windings introduces a number of problems not encountered in using liquid to "direct-cool" the stator windings.

Foremost is the problem of the centrifugal force exerted by the liquid in the spinning rotor. This causes tremendous liquid pressures which increase parabolically with the outer radius of the liquid column, if the liquid column extends from the axis of rotation. The conductors of the rotor always incur the danger that it is broken by the centrifugal force and a pump-pressure for delivering the liquid coolant. In order to avoid the danger of breaking the system of vaporizing the liquid coolant in the passages of the conductors may be adopted, but according to this system, additional discharging means becomes necessary when the amount of the coolant fed into the passages exceeds the fixed amount of the corresponding vaporized coolant and the amount of the liquid coolant within the passages is gradually increased with the result that the coolant is flooded out of the passages or that the inner pressure of the passages is increased. Further, when the amount of supply of the coolant is decreased, the amount of the liquid coolant within the passages is gradually decreased, and the coolant can not be properly supplied to the entire passages, with the result that the rotor is overheated.

Any scheme to make liquid connections leading to the passages of the conductors from a rotor spindle portion must allow for movement of the windings in the rotor slots due to thermal expansion and contraction. Hence the windings at the location of the liquid connections must be restrained so that no movement can occur to disturb the connections and cause leaks.

An object of this invention is to provide a rotor comprising means which adopts a cooling spray system conveniently to supply a coolant into passages of conductors only in use of a centrifugal force by the rotation of the rotor, whereby the movement of a winding due to thermal expansion or contraction is allowed by using in said spray system nozzles which are not physically directly connected to said passages in order that a large distructive power may not be applied to said rotor, and means provided in the conductors to drop the interior pressure in the passages of the conductors.

According to this invention, there is further provided a cooling device for cooling a rotor of an electrically rotary machine comprising a fluid coolant container disposed on an axis of the rotor, said container having a plurality of nozzles of which openings are directed in the diametrical direction, a rotor body having a plurality of circumferentially spaced winding slots, and a plurality of windings located in said slots, said windings consisting of conductors which have coolant passages therein and whose end turns have a plurality of receivers whose inlets are respectively corresponded to said nozzles in the diametrical direction, said receivers being respectively connected through orifices to the coolant passages.

Where the liquid coolant introduced into the coolant passages and heated by heat-exchange is to be repeatedly recovered for circulation, the coolant, which only flows in the passages by a centrifugal force, must be derived from the outer circumference of the rotor and in the semi-diametric direction with respect to the rotor axis. For this reason, the cooling device may be provided with drain tubes having orifices in the end turn of the conductors and a drainage for receiving the heat-exchanged coolant and for returning it to a cooler of the cooling cycle.

According to this invention, there is further provided a cooling device for cooling a rotor of an electrically rotary machine comprising a fluid coolant container disposed on an axis of the rotor, said container having a plurality of nozzles of which openings are directed in the diametrical direction, a central body having a plurality of circumferentially spaced winding slots, a plurality of windings located in said slots, said windings consisting of conductors which have coolant passages, said conductors being arranged in the diametrical direction and connecting passages to each through overflow spillways which are adapted to drop the interior presure in the passages of the conductors. Further, to keep the coolant level in each passage constant, said nozzles opening in the passages of the innermost conductors, and gas passages passed through the conductors in the diametrical direction to eject gas from the circumference of the rotor body and connected to each other through the coolant passages.

Preferably, the cooling device may comprise a detecting annulus which passes through lead-pipes from the coolant passages of the outermost conductors and particularly in which a detecting means for detecting the coolant liquid level is provided. With this construction, the liquid level in the detecting annulus coincides with that of the passages of the outermost conductor. Thus, the liquid level of such passages may be detected by said detecting means making it possible to control the amount liquid coolant to be supplied into the passages from the nozzle. The coolant passages may be shaped to have a channel cross section.

Other objects and advantages of the invention will become apparent from the following description taken in connection with the accompanying drawings, in which:

FIG. 3 is a sectional perspective view of an end turn of conductors shown in FIG. 1;

FIG. 4 is an enlarged sectional view of an end turn portion of conductors shown in FIG. 3;

FIG. 5 is a cross sectional view taken on the line V—V in FIG. 3;

FIG. 6 is an enlarged sectional view of another portion of conductors shown in FIG. 1;

Figure 1:
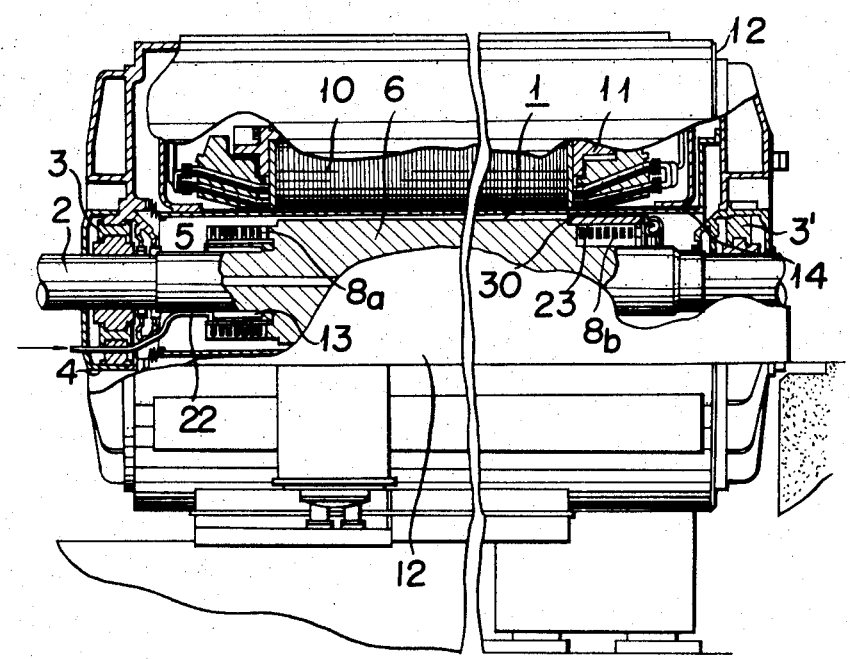
FIG. 1 shows a side elevational view, partly broken away, of a turbine-driven and heavy burden generator which has a cooling device embodying this invention.
Figure 2:
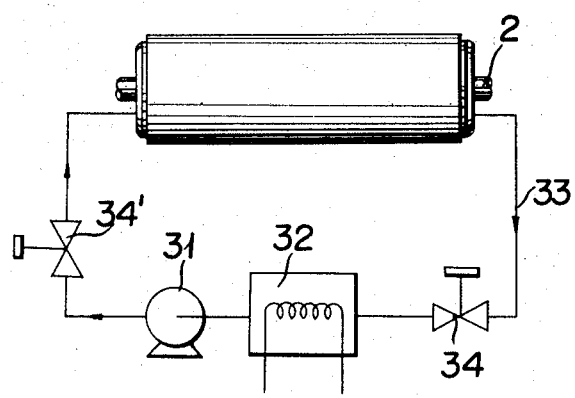
FIG. 2 is a schematic view of a cooling cycle for the cooling device.

Referring to the accompanying drawings, and particularly to FIGS. 1 to 7, the reference numeral 1 generally designates a rotor of a horizontal type heavy burden generator having an axis 2 which is horizontally extended and rotatably supported in metal bearings 3, 3' mounted in housing, at its both ends, said bearings being located on a base frame 4. The axis of the rotor is connected to the driven axis of a horizontal turbine (not shown) and has an integral spindle portion 5.

A rotor body 6 of the rotor is disposed on the spindle portion 5 and has slots 7 which are arranged respectively in parallel to the axis of the rotor and spaced circumferentially therein. The slots receive windings which respectively have layers of conductors 8, said conductors 8 respectively having a pair of passages of circular cross section 21a, 21b, . . . 21e are being coated with a strand insulation on their surfaces.

The conductors are rigidly secured through a slot insulation 9 in the slots by wedge pieces 9' and extend out of ends of the slots. Stator cores 10 define a central bore within which the rotor turns and are secured on a frame 11 mounted in the housing 12 by means of stud-bolts and check plates. Between end turns 8a of the conductors 8 and the spindle portion 5 is positioned a fluid coolant or refrigerant container 13 having a doughnut shape which has a plurality of nozzles 16 of which forward openings are directed in the diametrical direction in seven rows in the circumferential direction on its round surface. The rotor is covered by a can 14 which is located between the stator cores and the extended portion of the conductors, said can 14 being rotatably secured on the axis at its ends and sealing the rotor to prevent the vapor and liquid from escaping from the conductors. The conductors respectively have a plurality of receiver units, each of which includes tubular receivers 17a, 17b, . . . 17e, of which inlets are respectively corresponded to the nozzles in substantially the diametrical direction, said receivers respectively passing through orifices 18 formed in their end to recesses 19a, 19b, . . . 19e connected through pathes 20 to pairs of passages 21a, 21b, . . . 21e, corresponding thereto.

Inserted to the container from left side in FIG. 1 is a feed pipe 22 which is connected to the delivery of a pump through the wall of the housing 12, as will be described later in detail.

A retaining ring 23 is provided around the other extended portions 8b of the conductors 8 with a slight spacing and supports a centering ring or flange 24 which is mounted about the spindle portion. The retaining ring provides outlet slots 26 which are circumferentially spaced in a row around the flange of the retaining ring for passing the coolant to a drainage 25. The drainage 25 is provided with a labyrinth packing 36 facing to the end of the retaining ring 23 and having a wall of a spiral cross section for leading a drain body, the outer end 25' of the wall forming a curved surface to receive the drain flowing along a hyperbolic curve due to the centrifugal force caused by rotation of the rotor. Drain tubes 27 whose openings are directed in the diametrical direction of the rotor axis in registry with grooves 35 formed in the inner wall of the retaining ring are respectively passed through holes 28 to the passages, as only passages of one of the units shown in FIG. 6, and which are respectively provided with orifices 29 at their one end or intermediate portion. These orifices function to drop the interior pressure of the passages. The retaining ring also has a locking key 30 located between the inner surface of the ring 23 and the outer surface of the rotor cores for supporting said ring.

The pump 31 is connected to a cooler 32 which in turn is connected to the drainage 25 through a lead pipe 33 via a flow control valve 34, said drainage being located on the bearing or a foundation, and between the pump and the container is located a throttle valve 34'.

When the axis 2 of the rotor is driven by the rotation of the turbine axis (not shown), a fluid coolant such as water or freon, which is discharged in the container 15 by driving the pump, is concentrated near the inner wall of the container by the centrifugal force thereof, and thus the coolant is sprayed in the diametrical direction through nozzles 16 and through the free space formed between said nozzles and receivers 17a. The coolant is stored in receivers 17a . . . so that the inner walls of the receivers may not take a pressure without centrifugal power. The water is led through each of passages 21a, 21b, . . . 21e into drain tubes 27 and thus the water will be projected through the orifices 29 into the grooves 35 by the centrifugal power and discharge into the drainage 25.

The conductors are heat-exchanged by the coolant during the time it passes through the passages 21a, . . . and hot-water is removed out of the rotor. The hot-water is led by the lead pipe into the cooler 32, and cooled in the state of liquid.

The orifices 18 and 29 respectively resist a flow of the coolant water and reduce the pressure of the coolant flowing through the passages so that the movement of the windings due to thermal expansion or contraction is allowed since the nozzle is not in direct contact with the passages of the conductor. Further, the provision of flexible connecting tubes becomes unnecessary, the construction becomes simpler, and a pressure drop is made only due to a centifugal force and yet by the orifice so that breakage of the conductor due to physical power may be avoided.

Figure 8:
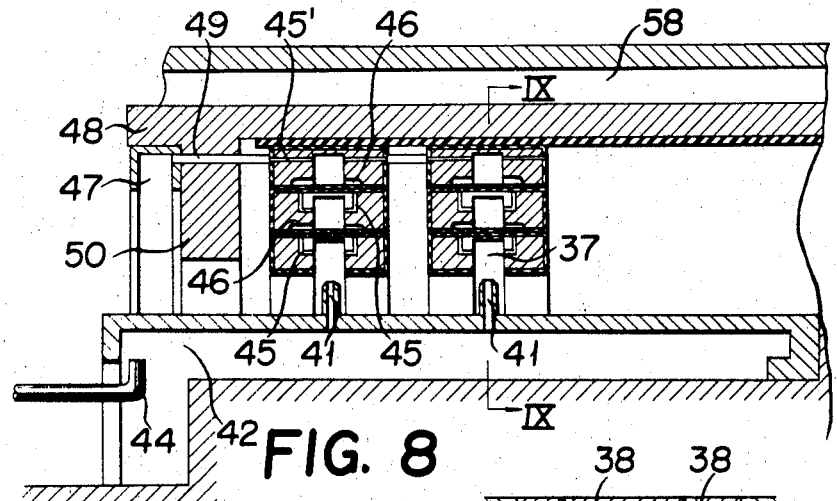
FIG. 8 is an enlarged sectional view of a modification of the same portion of conductors as shown in FIG. 4, for a cooling device for evaporatively to cool the rotor.
Figure 7:
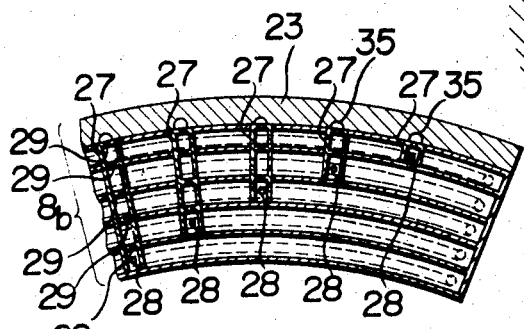
FIG. 7 is a cross sectional view taken on the line VII—VII in FIG. 6.
Figure 9:
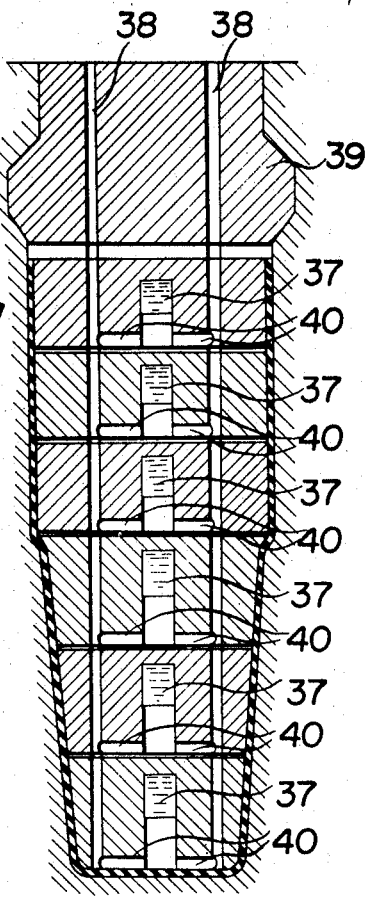
FIG. 9 is a cross sectional view taken on the line IX—IX in FIG. 8.
Figure 10:
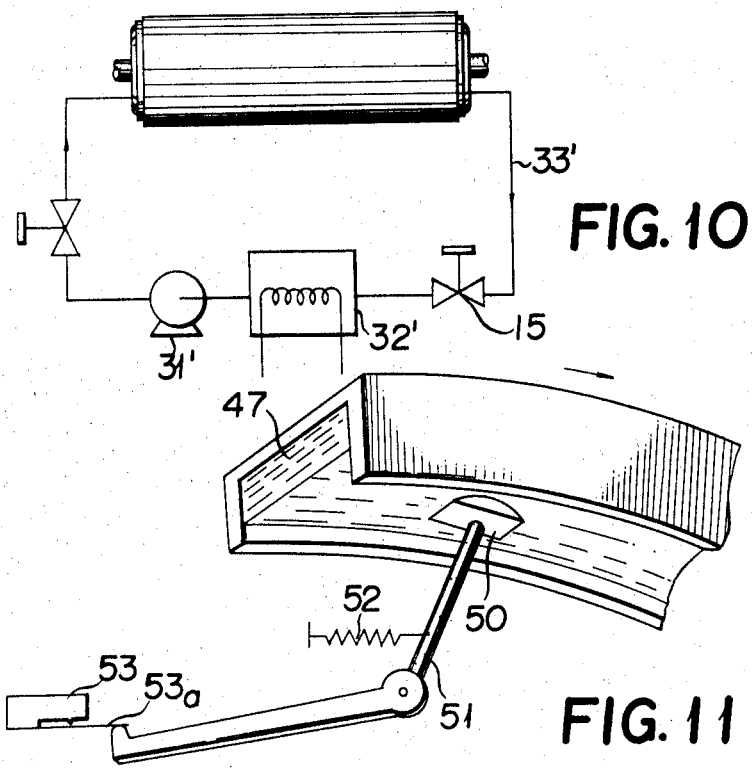
FIG. 10 is a circuit diagram of a cooling system for effecting cooling by evaporation and particularly of a cooling cycle applicable to the cooling device shown in FIGS. 7 to 9.

According to FIGS. 8 and 10, a modification of the cooling device for evaporative cooling is shown. Conductors of this modification are different from those shown in FIGS. 1 to 7 in that they respectively have a coolant passage 37 having a channel cross section along their longitudinal direction and a pair of gas passages 38 are extended in the diametrical direction, and respectively opening out of the rotor body through the wedge 39 which is adapted to positively hold the winding in the slot. Grooves 40 are respectively provided in such surfaces of the conductors that are faced to the rotor axis in order to pass the produced gas from the coolant passages 37 to the gas passages 38. Corresponding to the coolant passages 37 of the innermost conductors of the windings are nozzles 41 extended in the diametrical direction and mounted on the outer surface of a container 42 which is secured on a spindle portion 43 of the rotor axis and defines an annulus chamber in which the forward end of a stationary feed pipe 44 for supplying the coolant is disposed.

Overflow spillways 45 of narrow corss section are respectively formed in the conductors and passed through grooves 46 cut in the conductors at their surface facing to the rotor axis from the coolant passage of the conductor to the passage of the succeeding conductor lying more remote from the rotor axis. Overflow spillways 45' of the outermost conductors are connected with the passage 37 at its bottoms and contacted with a detecting annulus 47 located on the inner surface of a retaining ring 48 through lead-pipes 49 which are disposed protrudingly through a centering ring 50 formed on the retaining rng 48. As shown in FIG. 10, a pump 31' is connected to a condenser 32' which in turn is connected in the can 14a through a lead pipe 33' via a throttle valve 15, said can 14a being located on the housing or the foundation between the rotor and the stator, and between the pump and the container is located a throttle valve 58. The throttle valve 15 serves, by a degree of its opening, to keep the gaseous pressure within the can constant, and to adjust the temperature of vaporization.

In this modification, when the rotor is rotated, the fluid coolant is discharged into the container 42 by driving a pump 31' and the coolant is sprayed in the diametrical direction through the nozzles 41 and thus the coolant is received in the coolant grooves of the conductors to be stored in its bottom portion, overflowing to the overflow spillways, and through them the coolant is gradually supplied into the grooves 37 toward the outer conductors.

The conductors are heat-exchanged by evaporating the coolant in the coolant grooves when it passes through each of the coolant grooves 40 into the gas passages 38, and is ejected out of the body of the rotor, so that the gas will be filled in the can 14a which covers the rotor between the rotor and the stator cores and which prevents the gas from flowing out of the can 14a and weds the stator windings, and will be transferred through a lead pipe (not shown) into a condenser. They are included in a coolant cycle which is the same as that shown in FIG. 2.

While the unevaporated coolants pass through the overflow spillways from one of the passages to the other which is arranged outer than the former during the passing of this coolant is evaporated in cooling passages by the heat-exchanging to the conductors, and thus the remained coolant is transferred through the lead-pipes 49 into the detecting annulus 47. A liquid level of coolant in said annulus is defined by the amount of the coolant supplied from the nozzles 41 to the passages 37, and said amount of the coolant is possible to be controlled by a suitable means.

Figure 11:
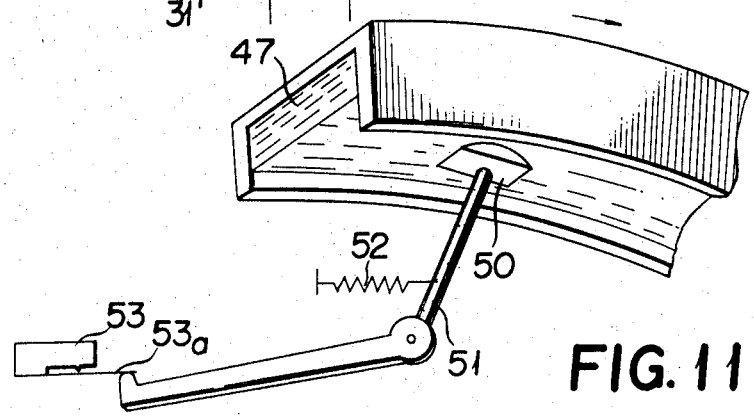
FIG. 11 is a schematic perspective view of an automatic controller used for the cooling cycle of the cooling device evaporatively to cool the rotor.
Figure 12:
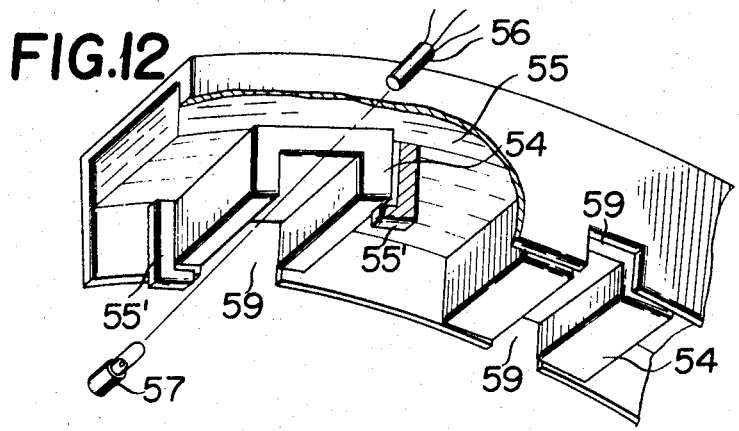
FIG. 12 is a schematic perspective view of a modification of the controller.

An automatically detecting means for controlling the amount of the coolant is shown in FIG. 11 and a modification thereof is shown in FIG. 12. According to FIG. 11 a floating system which comprises a floating block 50 arranged in the detecting annulus 47, and a lever 51 secured on the block at the one end are provided, said lever being pivotally mounted on the housing at the intermediate portion and urge with a spring 52, and other end of said lever being corresponded to a switch means such as a micro-switch for contacting and discontacting the switch lever 53a of the switch means by swing of the lever 51, said swing being derived from the variation of said level of the coolant in the annulus.

The contacting or discontacting of the switch lever acts as switching of the controlling drive of a pump or the operation of the throttle valve connected to the delivery of said pump relating to the coolant cycle, so that the level of the unevaporated coolant in the annulus is constantly adjustable by a supply of coolant from the nozzles via the container and the feed pipe, by driving the pump or operating the throttle valve when the coolant is passed through the overflow spillways to the passages 37 and evaporated therein.

According to FIG. 12, there is a floating system which is different from the one shown in FIG. 11 and comprises floating blocks 54 floated in the detecting annulus 55 and spaced from each other. Pairs of floating guides 55' of bar shape are secured in the detecting annulus and on the inner side wall thereof, said floating blocks 54 being respectively disposed between a pair of the floating guides 55'. Slits 59 are formed in the side wall of the detecting annulus 55 in response to the floating blocks 54 to pass the beam over the floating block 54 when they floatingly shift in the annulus depending upon the variation in the coolant level. A photoconductive cell 56 and an electric tube 57 are stationarily disposed on opposite sides of the annulus.

Thus the floating blocks move with the rotation of the annulus by the rotation of the rotor, and the slits formed in the wall of the annulus pass, one by one, across between the cell and the electric tube. When the level of the coolants is low, a beam emitted from the electric tube toward the cell reaches the cell across the upper surface of the blocks and renders the cell to generate an electric current, and this staged continuation becomes a sort of a pulse current and energizes a means for controlling the amount of supply of coolant to the passages of the conductors. When, for example, the coolant level is raised due to an excess supply of the coolant, the beam is intercepted by the blocks and either produces no pulse current or changes its wave form. Thus, the condition of energization of the controlling means is changed whereby the amount of supply of the coolant is decreased. In the above floating system the amount of the supplied coolant tends to be excess.

As a result, the adjusting of the level of the coolant is sufficiently effected like that of the floating system in FIG. 11 and already described.

What is claimed is:

1. A rotary electric machine having rotor which includes a shaft, a member having a plurality of axial winding slots and plurality of conductors received in said winding slots to form the rotor windings, each of said conductors having a coolant passage therein, further comprising:

a fluid coolant container mounted between and turns of said rotor windings and said rotor shaft;

a plurality of nozzles arranged on the outer periphery of said coolant container, a free space being formed between said nozzles and said rotor windings, end turns of said conductors being adapted to receive said coolant for passage through said coolant passages; and means associated with said conductors for dropping the interior pressure in said coolant passages of said conductors.

2. Apparatus according to claim 1 further comprising a sealed cylindrical member enclosing said rotor windings.

3. Apparatus according to claim 1 wherein said conductors have a plurality of receivers whose inlets are spaced from and in registration with respective ones of said nozzles, said receivers being respectively connected to the coolant passages through orifices which are adapted to drop the interior pressure in the passages.

4. Apparatus according to claim 3 wherein end turns of said conductors include drain tubes having orifices, said drain tubes being connected to the coolant passages, and comprising a stationary drainage for receiving the heat-exchanged coolant from said drain tubes for returning it to a cooling apparatus.

5. Apparatus according to claim 1 wherein said conductors are arranged in a diametrical direction and further comprising overflow spillways connecting a conductor to another conductor, said overflow spillways being adapted to drop the interior pressures in the passages, said nozzles being spaced from and opening into the passages of the innermost conductors a stationary member disposed about and spaced from the rotor; and gas passages passed through said conductors in a diametrical direction to eject the gas from the circumference of the rotor body, said gas passages being connected to each other via the coolant passages.

6. Apparatus according to claim 2 wherein said cooling liquid is presented with a substantially constant volume in said passages in said conductors, and further comprising a plurality of vapor discharge paths in communication with said cooling passages in said conductors for passing the vapor evaporated from said cooling liquid in said cooling passages into said sealed cylindrical member which encloses the rotor windings.

7. Apparatus according to claim 6 wherein a plurality of said conductors are stacked in the radial direction and wherein said cooling liquid is supplied via said nozzles to the radially innermost conductors of end turns of said rotor winding, said liquid being supplied from said nozzles by means of centrifugal force, and further comprising a plurality of overflow channels in communication with said coolant passages for supplying surplus cooling liquid in said innermost conductors to the outer conductors, thereby supplying a substantially constant volume of cooling liquid in each conductor.

8. Apparatus according to claim 5 comprising a detecting annulus which passes through lead-pipes from the coolant passages of the outermost conductors; and a detecting means for detecting the coolant level.

9. Apparatus according to claim 8 wherein the coolant passages are shaped to have a channel cross-section.

10. Apparatus according to claim 8 wherein said detecting means is a float system which is further adapted to control the amount of coolant supplied to the coolant container.

References Cited

UNITED STATES PATENTS

| | | | |
|---|---|---|---|
| 2,724,064 | 11/1955 | Kilner | 310—61 |
| 2,760,091 | 8/1956 | Barlow | 310—61 |
| 2,787,721 | 4/1957 | Tudge | 310—61 |
| 3,075,104 | 1/1963 | Willyoung | 310—61 |
| 3,097,317 | 7/1963 | Fechheimer | 310—61 |

JOHN F. COUCH, *Primary Examiner.*

D. J. HARNISH, *Assistant Examiner.*

U.S. Cl. X.R.

310—61